United States Patent [19]

Akitsu

[11] Patent Number: 5,421,847
[45] Date of Patent: Jun. 6, 1995

[54] DUST COLLECTING APPARATUS FOR HIGH-TEMPERATURE GAS

[75] Inventor: Yasuo Akitsu, Handa, Japan
[73] Assignee: NGK Insulators, Ltd., Japan
[21] Appl. No.: 208,718
[22] Filed: Mar. 11, 1994

[30] Foreign Application Priority Data

Mar. 12, 1993 [JP] Japan .................. 5-051855

[51] Int. Cl.6 .............................................. B01D 46/00
[52] U.S. Cl. .......................................... 55/302; 55/502; 55/523
[58] Field of Search ................. 55/302, 431, 494, 502, 55/523, DIG. 30; 60/311

[56] References Cited

U.S. PATENT DOCUMENTS

| | | | |
|---|---|---|---|
| 4,238,455 | 12/1980 | Ogiwara | 422/171 |
| 4,416,675 | 11/1983 | Montierth | 55/523 |
| 4,737,176 | 4/1988 | Lippert et al. | 55/523 |
| 4,830,642 | 5/1989 | Tatge et al. | 44/302 |
| 4,830,749 | 5/1989 | Okamoto et al. | 55/523 |
| 4,904,287 | 2/1990 | Lippert et al. | 55/302 |
| 4,924,570 | 5/1990 | Mizrah et al. | 29/163.8 |
| 4,960,448 | 10/1990 | Zievers | 55/523 |
| 5,078,760 | 1/1992 | Haldipur et al. | 55/523 |
| 5,178,652 | 1/1993 | Huttlin | 55/302 |
| 5,228,892 | 7/1993 | Akitsu et al. | 55/523 |

FOREIGN PATENT DOCUMENTS

| | | |
|---|---|---|
| 0057251 | 8/1982 | European Pat. Off. . |
| 0089127 | 9/1983 | European Pat. Off. . |
| 0124863 | 11/1984 | European Pat. Off. ............... 55/523 |
| 0317501 | 5/1989 | European Pat. Off. . |
| 0393729 | 10/1990 | European Pat. Off. . |
| 0501733 | 9/1992 | European Pat. Off. . |
| 3941321 | 6/1991 | Germany ............................. 55/302 |
| 4-354506 | 12/1992 | Japan . |

OTHER PUBLICATIONS

Patent Abstract of Japan, JP-A-95 256 121, vol. 18, No. 16, Jan. 12, 1994.
Patent Abstract of Japan, JP-A-4 354 506, Jan. 8, 1992.

*Primary Examiner*—Charles S. Bushey
*Attorney, Agent, or Firm*—Parkhurst, Wendel & Rossi

[57] ABSTRACT

A dust collecting apparatus of the type which includes an upright cylindrical housing provided therein with a plurality of circumferentially spaced lateral support beams arranged to form a vertical gas induction passage at the center of the housing and a plurality of circumferentially spaced vertical discharge passages along an internal peripheral surface of the housing, and plural sets of circumferentially spaced filter assemblies vertically mounted on the support beams in such a manner that the filter assemblies are exposed at their inner ends to the gas induction passage and at their outer ends to the discharge passages, wherein an internal upright support housing is disposed within the cylindrical housing concentrically therewith to form the vertical gas induction passage, the filter assemblies are coupled at their inner ends with the corresponding openings formed in the peripheral wall of the support housing, and the support housing is vertically displaceably coupled at its upper end with a gas indution duct connected to the upper end of the cylindrical housing.

6 Claims, 5 Drawing Sheets

DUST COLLECTING APPARATUS FOR HIGH-TEMPERATURE GAS

BACKGROUND OF THE INVENTION

1. Field of the Invention

The present invention relates to a dust collecting apparatus for purifying high-temperature gases.

2. Description of the Prior Art

In the case that high-temperature gases are utilized as a source of thermal energy, it is required to eliminate dust from the high-temperature gases for use in a clean condition. In the case that exhaust gases are discharged into the atmospheric air, it is also required to eliminate dust from the exhaust gases.

To satisfy the requirements described above, there have been various dust collecting apparatuses for purifying the high-temperature gases. In Japanese Patent Laid-open Publication No. 4-354506, there is disclosed a dust collecting apparatus of this kind which has an upright cylindrical housing provided therein with a pair of radially spaced vertical partition wall members secured at their side edges to an internal peripheral wall of the cylindrical housing to form a pair of vertical gas induction passages along the internal peripheral wall and to form a discharge passage at the center of the cylindrical housing, plural pairs of vertically spaced horizontal support members fixed to the vertical parition wall members, plural sets of filter assemblies vertically mounted on each pair of the horizontal support members in such a manner that the filter assemblies are exposed at their inner ends to the vertical discharge passage and at their outer ends to the vertical induction passages, the filter assemblies each being composed of a plurality of filter elements integrally assembled as a unit, each of the filter elements being made of porous ceramic material and having a thin walled cellular structure formed with a plurality of axial passages separated from each other by thin partition walls, wherein a first group of the axial passages are opened at their one ends to introduce therein high-temperature gases to be purified from the vertical induction passage and closed at their other ends, while a second group of the axial passages are closed at their one ends and opened at their other ends to discharge purified gases therefrom into the vertical discharge passage.

Although the purifying efficiency of the dust collecting apparatus is extremely high, the component parts of the dust collecting apparatus such as the cylindrical housing body, the vertical partition wall members, the horizontal support members and the filter assemblies are made of different materials, That is to say, the vertical partition wall members are, in general, made of metal, while the filter assemblies are made of porous ceramic material superior in durability. It has been, however, found that when the dust collecting apparatus is adapted to purify high-temperature gases at a high temperature more than 700° C., the joint portions of the filter assemblies with the vertical partition wall members are applied with heavy stress due to difference in thermal expansion and contraction of the component parts, resulting in damage of the filter assemblies in a short period of time.

SUMMARY OF THE INVENTION

It is, therefore, a primary object of the present invention to provide an improved dust collecting apparatus suitable for efficiently purifying high-temperature gases without causing any problem described above.

According to the present invention, the object is accomplished by providing a dust collecting apparatus for purifying high-temperature gases applied thereto, which includes an upright cylindrical housing provided therein with a plurality of circumferentially spaced lateral support beams which are arranged to form a vertical gas induction passage at the center of the cylindrical housing and a plurality of circumferentially spaced vertical discharge passages located along an internal peripheral surface of the cylindrical housing, at least one filter assembly unit composed of a plurality of circumferentially spaced filter assemblies placed on the support beams of the cylindrical housing in such a manner that the filter assemblies are exposed at their inner ends to the vertical gas induction passage and at their outer ends to the respective vertical discharge passages, the filter assemblies each being composed of a plurality of filter elements integrally assembled as a unit, each of the filter elements being made of porous ceramic material and having a thin walled cellular structure formed with a plurality of axially passages separated from each other by thin partition walls, wherein a first group of the axial passages are opened at their one ends to introduce therein high-temperature gases to be purified from the vertical gas induction passage and closed at their other ends, while a second group of the axial passages are closed at their one ends and opened at their other ends to discharge purified gases therefrom into each of the vertical discharge passages, wherein an internal upright support housing is disposed within the cylindrical housing concentrically therewith to form the vertical gas induction passage, the filter assemblies are coupled in an air-tight manner at their inner ends with the corresponding openings formed in the peripheral wall of the support housing, and the internal upright support housing is vertically displaceably coupled with a gas induction duct connected to an upper end of the cylindrical housing.

In a practical embodiment of the present invention, the filter assembly unit includes plural sets of circumferentially spaced filter assemblies vertically placed on the support beams of the upright cylindrical housing. Preferably, the lateral support beams are provided at a plurality of vertically spaced steps within the upright cylindrical housing, and the filter assembly unit is placed on the lateral support beams at the respective steps.

BRIEF DESCRIPTION OF THE DRAWINGS

Other objects, features and advantages of the present invention will be more readily appreciated from the following detailed description of a preferred embodiment thereof when considered with reference to the accompanying drawings, in which.

DESCRIPTION OF THE PREFERRED EMBODIMENT

Figure 1:
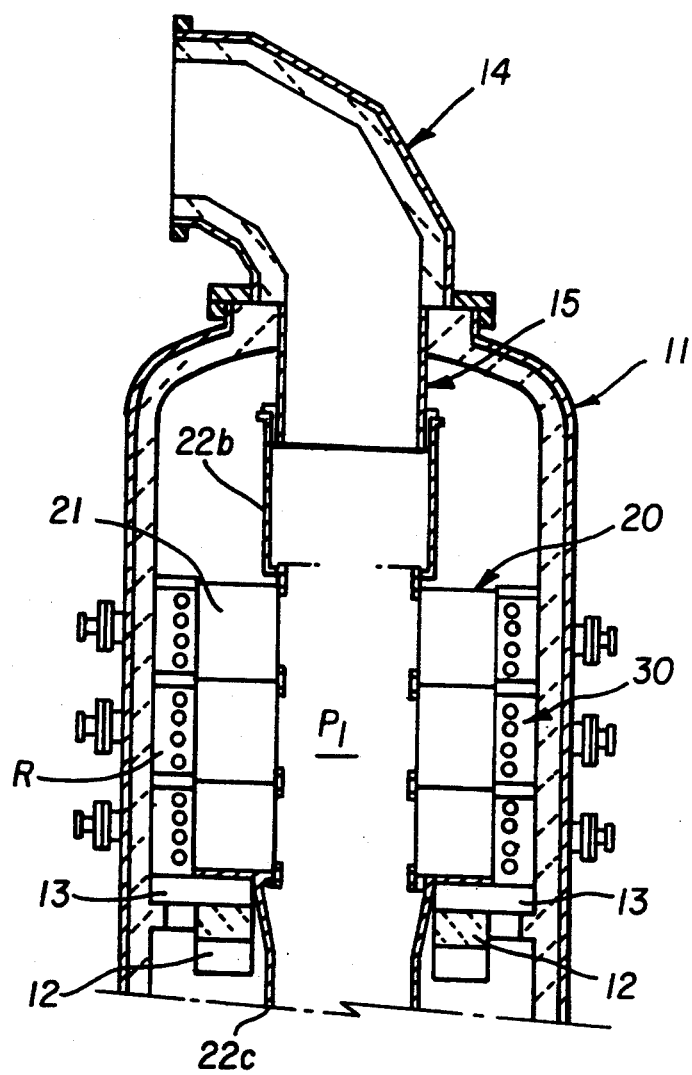
FIG. 1 is a vertical sectional view of a dust collecting apparatus for high-temperature gases in accordance with the present invention.
Figure 1:
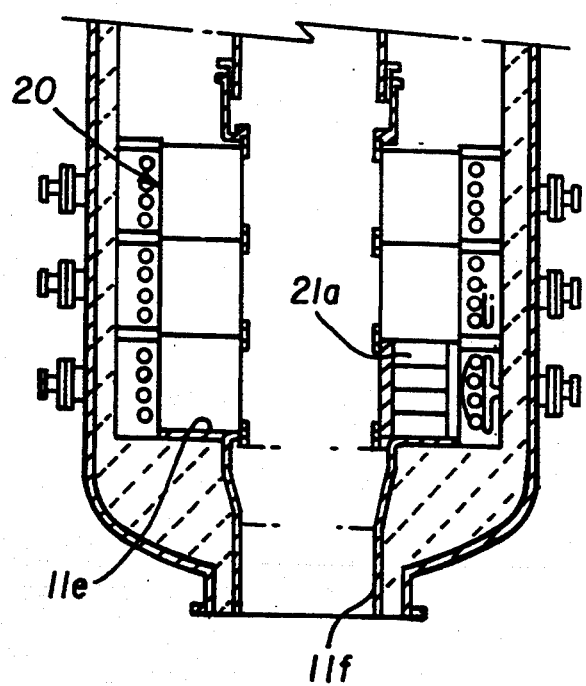
Figure 4:
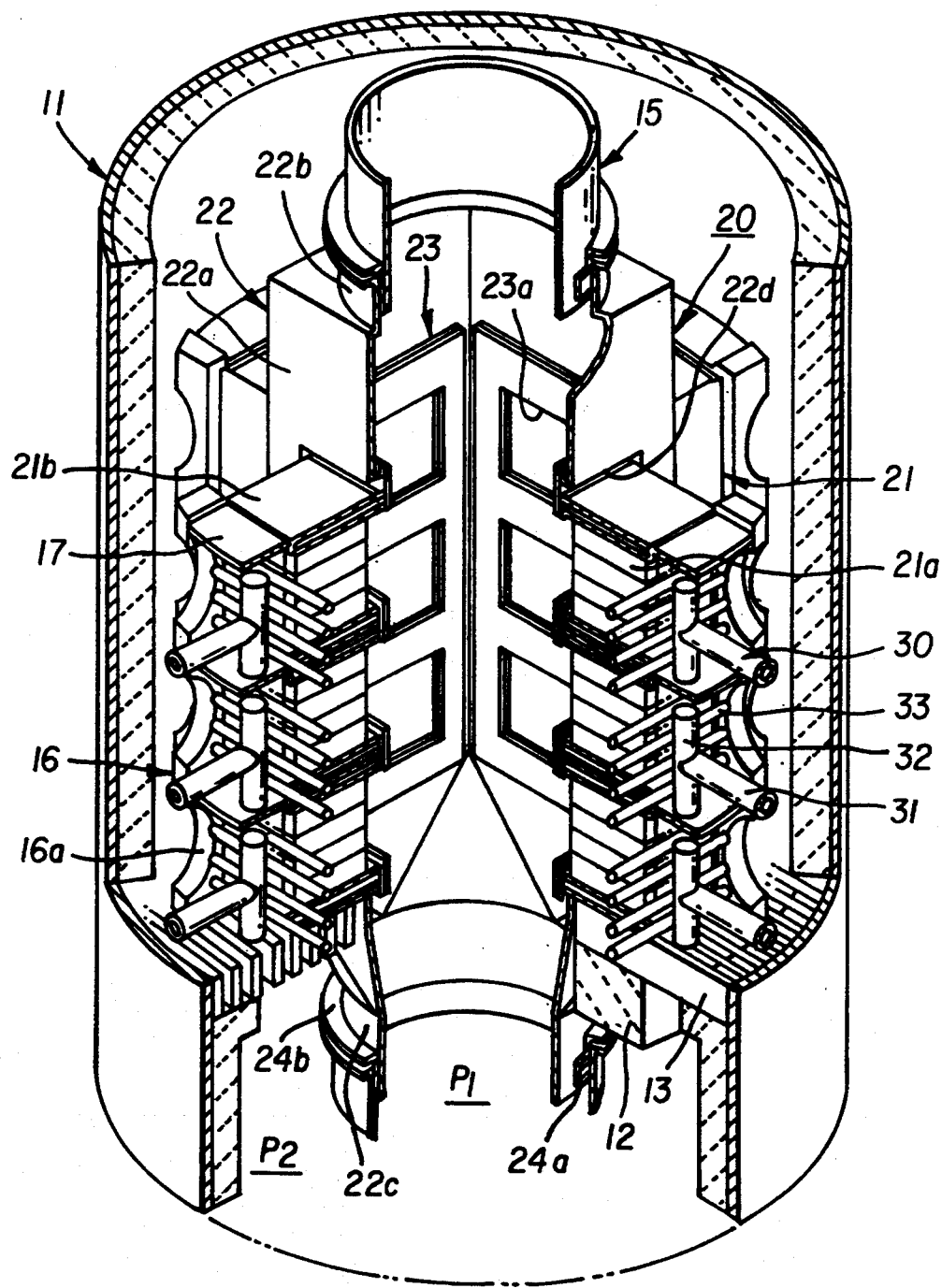
FIG. 4 is a partly broken perspective view illustrating a filter assembly unit mounted within the dust collecting apparatus shown in FIG. 1.

Referring now to the drawings, FIG. 1 illustrates a dust collecting apparatus for purifying high-temperature gases in accordance with the present invention. The dust collecting apparatus includes a plurality of vertically spaced filter assembly units 20 mounted within an upright cylindrical housing 11. The filter assembly units 20 each are composed of a plurality of circumferentially equally spaced filter assemblies 21 each of which is composed of a plurality of filter elements 21a horizontally arranged in parallel to one another and assembled as a unit as shown in FIG. 4. The filter elements 21a each are made of porous ceramic material and have a thin walled cellular structure or honeycomb structure formed with a plurality of axial passages separated from each other by thin partition walls, wherein a first group of the axial passages are closed at their one ends and opened at their other ends, while a second group of the axial passages are opened at their one ends and closed at their other ends.

In the respective filter elements 21a, the first group of axial passages are arranged as inlet passages of high-temperature gases to be purified, while the second group of axial passages are arranged as discharge passages of purified gases. Thus, the high-temperature gases to be purified are introduced into the first group of axial inlet passages and discharged from the second group of axial discharge passages across the thin partition walls of the axial passages so that fine particles are collected from the gases at the partition walls to discharge the gases as purified clean gases from the second group of axial discharge passages.

Figure 5:
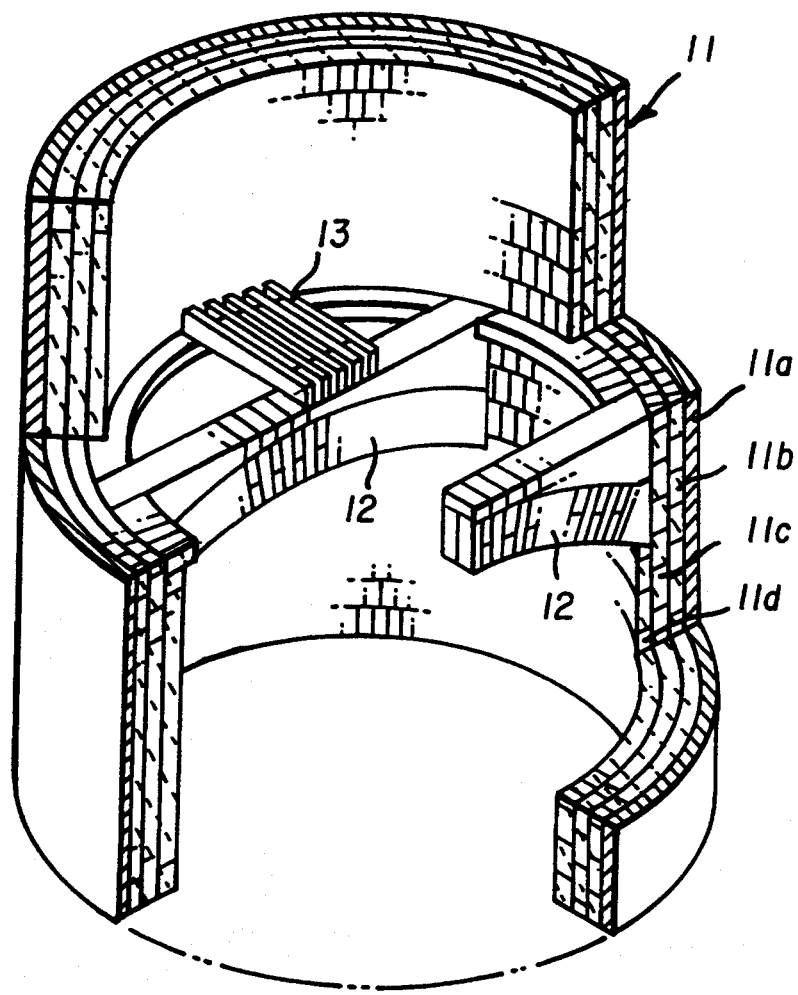
FIG. 5 is a partly broken perspective view illustrating support beams formed within an upright cylindrical

As shown in FIG. 5, the upright cylindrical housing 11 of the dust collecting apparatus is composed of an outer metallic cylindrical body 11a and inner cylindrical firebrick layers 11b, 11c and 11d. The upright cylindrical housing 11 is integrally formed therein with plural pairs of arched support beams 12 which are made of firebrick and equally spaced in a vertical direction. Each pair of the arched support beams 12 are horizontally arranged in parallel to form vertical discharge passages $P_2$ along the internal peripheral surface of upright cylindrical housing 11 and are provided thereon with a plurality of equally spaced parallel support beams 13 made of firebrick. The inner ends of parallel support beams 13 are aligned to form a vertical gas induction passage at the center of the upright cylindrical housing 11.

As shown in FIG. 1, a first gas induction duct 14 is fixedly connected to an uppermost opening of upright cylindrical housing 11, and a second gas induction duct 15 is fixedly connected to the lower end of gas induction duct 14. The second gas induction duct 15 is extended into the interior of housing 11 and positioned at the center of housing 11. The upright cylindrical housing 11 is formed at its internal lowermost end with an annular stepped portion 11e the central portion of which is formed as a dust discharge hole 11f for connection to a dust collecting hopper (not shown).

Figure 2:
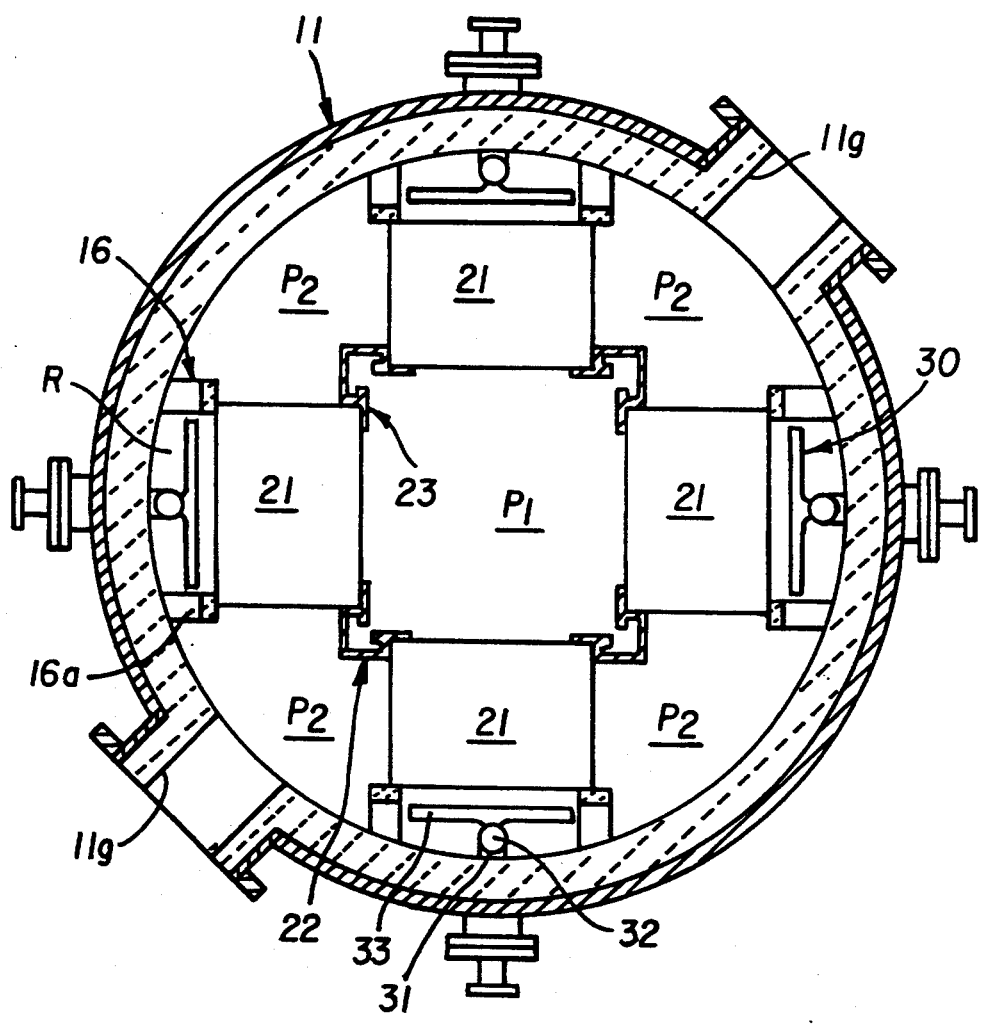
FIG. 2 is an enlarged cross-sectional view of the dust collecting apparatus.
Figure 3:
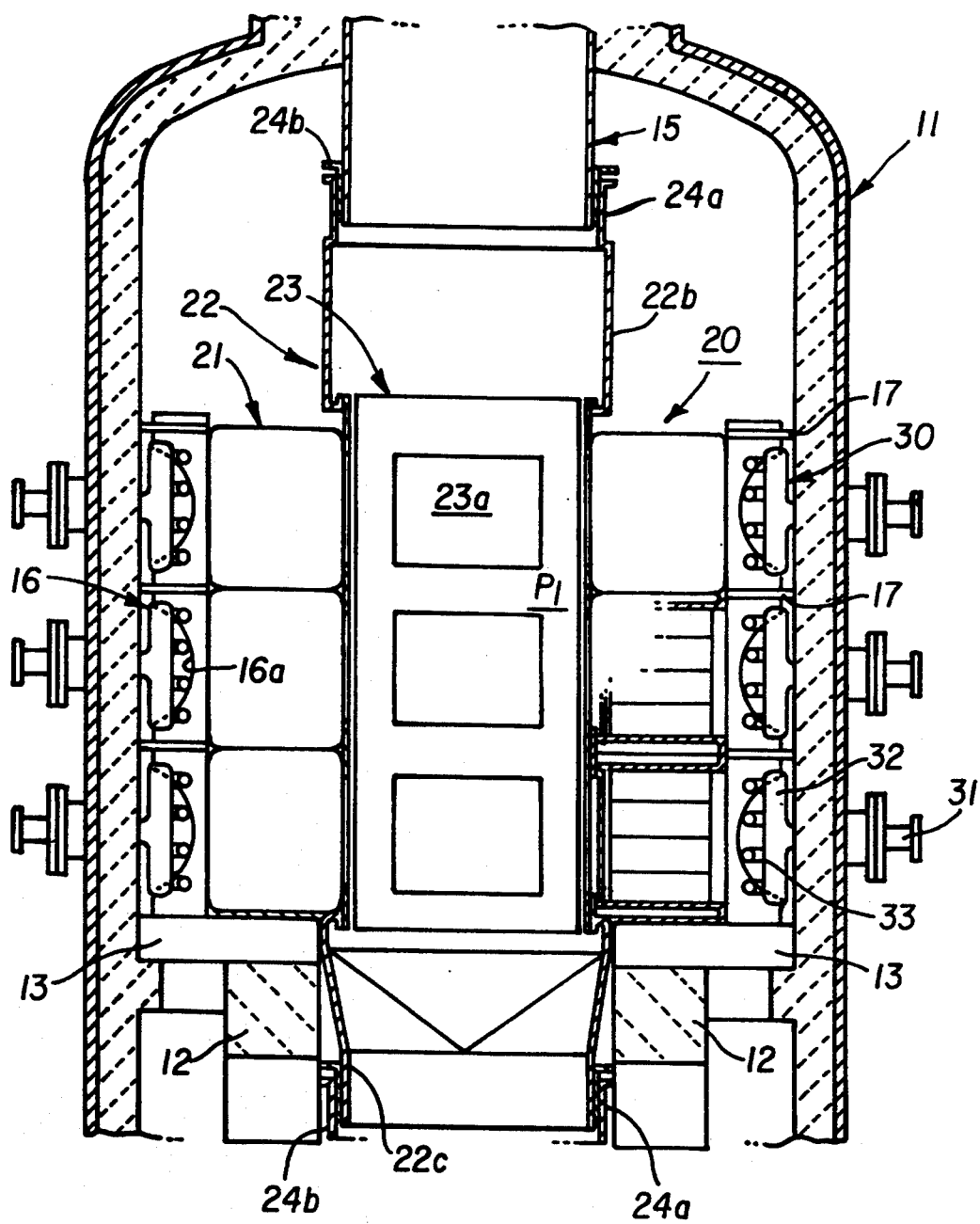
FIG. 3 is a partly enlarged vertical sectional view of the dust collecting apparatus shown in FIG. 1.

As shown in FIGS. 2 to 4, the filter assemblies 21 of the respective filter assembly units 20 are arranged at three steps in the vertical direction and in four lines in the circumferential direction. Thus, the filter units 20 each are composed of twelve filter assemblies 21. The filter assemblies 21 each are contained within a casing 21b which is mounted on each side wall 22a of an internal upright support housing 22 through a sealing plate 23. The internal upright support housing 22 is formed of square in cross-section and has an upper cylindrical portion 22b integrally formed at its upper end and a lower cylindrical portion 22c integrally formed at its lower end. The upright support housing 22 is formed at each side wall thereof with three square openings 22d which are equally spaced in the vertical direction, and the filter assemblies 21 each are coupled with the respective square openings 22d of support housing 22. The sealing plates 23 each are formed with three square openings 23a in the vertical direction which are arranged to correspond with the square openings 22d of internal upright support housing 22. The sealing plates 23 each are attached to each internal surface of side walls 22a in such a manner that each internal end of the filter assemblies 21 is sealed by engagement with the sealing plate 23 at each periphery of square openings 23a.

In the dust collecting apparatus, the lowermost filter assembly unit 20 is placed on the lowermost annular stepped portion 11e of housing 11, and the other filter assembly units 20 each are placed on the respective support beams 13 supported on the respective arched beams 12. In the lowermost filter assembly unit 20, the internal upright support housing 22 is coupled at its lower cylindrical portion 22c with the dust discharge duct 11f in the bottom portion of housing 11 and at its upper cylindrical portion 22b with the lower cylindrical portion 22c of upright support housing 22 located at the upper step thereof. In the filter assembly unit 20 located at the intermediate step, the upright support housing 22 is coupled at its lower cylindrical portion 22c with the upper cylindrical portion 22b of upright support housing 22 located at the lower step thereof and at its upper cylindrical portion 22b with the lower cylindrical portion 22c of upright support housing 22 located at the upper step thereof. In the uppermost filter assembly unit 20, the upright support housing 22 is coupled at its lower cylindrical portion 22c with the upper cylindrical portion 22b of upright support housing 22 located at the lower step thereof and at its upper cylindrical portion 22b with the gas induction duct 15.

At each joint portion of the filter assembly units 20, a heat-resisting annular seal member 24a of ceramic fibers is interposed between the upper cylindrical portion 22b of the uppermost filter assembly unit 20 and the gas induction duct 15 and retained by an annular thrust plate 24b. Thus, the upper cylindrical portion 22b of the uppermost filter assembly unit 20 is assembled to be axially displaceable relative to the gas induction duct 15. At the other joint portions, a heat-resisting annular seal member similar to the annular seal member 24a is interposed between the upper and lower cylindrical portions 22b and 22c to permit relative displacement of the support housings coupled with each other.

In such an arrangement of the filter assembly units 20, the gas induction passage $P_1$ formed in the internal upright support housings 22 is communicated with the gas induction ducts 14, 15 at its upper end and communicated with the dust discharge duct 11f at its lower end. In the interior of housing 11, the vertical discharge passages $P_2$ are formed among the filter assemblies 21 to discharge purified gases therethrough. The filter assemblies 21 of the respective filter assembly units 20 each are engaged at their outside corners with a pair of circumferentially spaced throttle plates 16 and a pair of vertically spaced partition plates 17 which are provided along the internal peripheral surface of housing 11. At each outside of the filter assemblies 21, the pair of circumferentially spaced throttle plates 16 are assembled with the pair of vertically spaced partition plates 17 to form a cavity R which contains therein a reverse washing means 30. The throttle plates 16 each are formed with a semi-circular opening 16a through which the cavity R is communicated with the gas discharge passage $P_2$.

The reverse washing means 30 includes a radial supply pipe 31, a vertical main pipe 32 connected to the radial supply pipe 32 and a plurality of vertically spaced lateral sub-pipes 33 connected to the vertical main pipe 32. The radial supply pipe 31 extends outwardly through the peripheral wall of housing 11 and connected to a supply source of gas or air under pressure (not shown). The lateral sub-pipes 33 are connected to the vertical main pipe 32 perpendicularly thereto in parallel to one another and opposed to each outside of the filter elements 21a. The lateral sub-pipes 33 each are formed with a plurality of jet holes which are opened toward the respective filter elements 21a to intermittently spurt jet streams of washing gas or air into the discharge axial passages of the respective filter elements 21a.

In operation of the dust collecting apparatus, high-temperature gases containing dust such as fine particles are supplied into the gas induction passage $P_1$ through the induction duct 14 and introduced into the inlet axial passages of the filter elements 21a of the respective filter assemblies 21 under a difference in pressure between the induction passage $P_1$ and discharge passages $P_2$. In this instance, the thin partition walls of filter elements 21a act to collect fine particles from the gases permeating therethrough into the discharge axial passages of filter elements 21a. Thus, purified gases are discharged from the discharge axial passages of filter elements 21a into the discharge passages $P_2$, while the fine particles are accumulated on the surfaces of partition walls of the filter elements 21a. The purified gases are discharged from outlet holes 11g of upright housing 11 to be utilized as a source of thermal energy.

When the component parts in the housing 11 are repeatedly heated at a high temperature during treatment of the high-temperature gases, the upper cylindrical portions 22b of the respective internal upright support housings 22 are axially displaced relative to the upper induction duct 15 and the lower cylindrical portions 22c at each joint portion therewith. Accordingly, even if the gas induction duct 15 and internal upright support housings 22 are thermally expanded or contracted, the component parts of the dust collecting apparatus will be protected from thermal stress applied thereto.

In the dust collecting apparatus, the filter assemblies 21 each are composed of the plurality of filter elements 21a, the filter assembly units 20 each are composed of the plurality of filter assemblies 21, and the filter assembly units 20 are arranged at vertically spaced plural steps. With such an arrangement of the filter assembly units 20, it is able to noticeably enhance the gas purifying performance of the dust collecting apparatus. In the dust collecting apparatus, the reverse washing means 30 is provided within the respective cavities R formed at each outside of the filter assemblies 21, and the discharge passages $P_2$ each are communicated with the respective cavities R through the respective semicircular openings 16a of throttle plates 16. In such an arrangement of the reverse washing means 30, the throttle plates 16 act to prevent reverse flow of washing gas or air spurted from the reverse washing means 30 thereby to effectively supply the washing gas or air into the axial discharge passages of filter elements 21a. This is useful to enhance the washing efficiency of the filter elements 21a.

What is claimed is:

1. A dust collecting apparatus for purifying high-temperature gases applied thereto, the dust collecting apparatus having an upright cylindrical housing provided therein with a plurality of circumferentially spaced lateral support beams which are arranged to form a vertical gas induction passage at the center of said upright cylindrical housing and a plurality of circumferentially spaced vertical discharge passages located along an internal peripheral surface of said cylindrical housing, at least one filter assembly unit composed of a plurality of circumferentially spaced filter assemblies placed on the support beams of said cylindrical housing in such a manner that the filter assemblies are exposed at their inner ends to the vertical gas induction passage and at their outer ends to the respective vertical discharge passages, said filter assemblies each being composed of a plurality of filter elements assembled as a unit, each of said filter elements being made of porous ceramic material and having a thin walled cellular structure formed with a plurality of axial passages separated from each other by thin partition walls, wherein a first group of said axial passages are opened at their one ends to introduce therein high-temperature gases to be purified from the vertical gas induction passage and closed at their other ends, while a second group of said axial passages are closed at their one ends and opened at their other ends to discharge purified gases therefrom into each of the vertical discharge passages, wherein an internal upright support housing is disposed within said upright cylindrical housing concentrically therewith to form the vertical gas induction passage, said filter assemblies are coupled in an air-tight manner at their inner ends with corresponding openings formed in a peripheral wall of said support housing, and said internal upright support housing is vertically displaceably coupled at its upper end with a gas induction duct connected to an upper end of said cylindrical housing.

2. A dust collecting apparatus as claimed in claim 1, wherein said filter assembly unit includes plural sets of circumferentially spaced filter assemblies vertically mounted on the support beams of said upright cylindrical housing.

3. A dust collecting apparatus as claimed in claim 1, wherein said lateral support beams are provided at a plurality of vertically spaced steps within said upright cylindrical housing, and filter assembly unit are mounted on said lateral support beams at the respective steps.

4. A dust collecting apparatus as claimed in claim 1, wherein said lateral support beams are arranged in a horizontal direction.

5. A dust collecting apparatus as claimed in claim 1, wherein a reverse washing means is provided at a discharge end of each of said filter assemblies to spurt jet streams of gas or air into the second group of said axial passages of said filter elements.

6. A dust collecting apparatus as claimed in claim 5, wherein throttle means are provided between said reverse washing means and each of said vertical discharge passages to prevent reverse flow of washing gas or air into said vertical discharge passages.

* * * * *